US010180333B2

(12) United States Patent
Jackson et al.

(10) Patent No.: US 10,180,333 B2
(45) Date of Patent: Jan. 15, 2019

(54) CROWD-SOURCED ELECTRIC VEHICLE CHARGING STATION IDENTIFICATION

(71) Applicant: Ford Global Technologies, LLC, Dearborn, MI (US)

(72) Inventors: Kenneth J. Jackson, Dearborn, MI (US); Raymond C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/235,786

(22) Filed: Aug. 12, 2016

(65) Prior Publication Data

US 2018/0045533 A1    Feb. 15, 2018

(51) Int. Cl.
  *G01C 21/36*    (2006.01)
  *B60L 11/18*    (2006.01)

(52) U.S. Cl.
  CPC ...... *G01C 21/3682* (2013.01); *B60L 11/1861* (2013.01); *B60L 2250/16* (2013.01); *B60L 2260/52* (2013.01)

(58) Field of Classification Search
  CPC ..... G01C 21/3682; G07C 5/004; B60L 1/003; B60L 11/1816; B60L 15/2045; B60L 2240/12; B60L 2240/14; B60L 2240/26; B60L 2240/34; B60L 2240/36; B60L 2240/423; B60L 2240/622; B60L 2240/667; B60L 2250/10; B60L 2250/12; B60L 2250/16; B60L 2250/52; B60L 2250/54; B60L 2250/0075; B60L 2250/146; B60L 2510/244; B60W 50/0097; B60W 57/0082; B60W 57/14; B60W 2550/14; B60W 2550/402; Y02T 10/7005; Y02T 10/7072; Y02T 10/72; Y02T 10/7283; Y02T 10/7291; Y02T 10/84; Y02T 90/162; Y02T 90/16; Y02T 90/14

See application file for complete search history.

(56) References Cited

U.S. PATENT DOCUMENTS

2012/0290506 A1* 11/2012 Muramatsu ........ G01C 21/3469
  705/412
2012/0306446 A1* 12/2012 Suganuma .......... B60L 11/1824
  320/109

(Continued)

FOREIGN PATENT DOCUMENTS

WO        2015049969 A1    4/2015
WO    WO 2015153140 A1 * 10/2015    ......... G01C 21/3469

OTHER PUBLICATIONS

Chynoweth et al. Accepted to 2014 IEEE PES Innovative Smart Grid Technologies (ISGT) Conference Feb. 19-22. Washington, DC, USA, 5 Pages, "Smart Electric Vehicle Charging Infrastructure Overview".

*Primary Examiner* — Rachid Bendidi
(74) *Attorney, Agent, or Firm* — Jennifer M. Stec; Brooks Kushman P.C.

(57) ABSTRACT

A vehicle computer system includes a processor configured to receive a destination, to output a charging station location for display in response to an estimated SOC being less than a threshold and the location being within a pre-defined distance from a vehicle, and to not automatically output the location otherwise such that as a difference between the SOC and threshold increases, the pre-defined distance increases.

16 Claims, 3 Drawing Sheets

(56) References Cited

U.S. PATENT DOCUMENTS

| | | | |
|---|---|---|---|
| 2013/0024306 A1* | 1/2013 | Shah | G06Q 20/32 |
| | | | 705/17 |
| 2013/0035804 A1* | 2/2013 | Nakazawa | G01C 21/3469 |
| | | | 701/1 |
| 2013/0282265 A1* | 10/2013 | Arita | G06F 17/00 |
| | | | 701/123 |
| 2013/0342310 A1* | 12/2013 | Park | B60L 3/12 |
| | | | 340/5.7 |
| 2014/0203077 A1 | 7/2014 | Gadh et al. | |
| 2014/0347018 A1* | 11/2014 | Boblett | B60L 11/1838 |
| | | | 320/162 |
| 2015/0226566 A1* | 8/2015 | North | G01C 21/3469 |
| | | | 701/428 |
| 2015/0226567 A1* | 8/2015 | North | G01C 21/3469 |
| | | | 701/533 |
| 2015/0251553 A1* | 9/2015 | Kano | G08G 1/0129 |
| | | | 701/22 |
| 2015/0367740 A1 | 12/2015 | McGrath et al. | |
| 2017/0030728 A1* | 2/2017 | Baglino | G01C 21/3469 |

\* cited by examiner

CROWD-SOURCED ELECTRIC VEHICLE CHARGING STATION IDENTIFICATION

TECHNICAL FIELD

The disclosure relates to electrical vehicles equipped with vehicle computer systems that may utilize charging stations to charge a vehicle battery.

BACKGROUND

Electric vehicles, such as hybrid-electric vehicles or battery electric vehicles, may have to be charged in order to operate. In long commutes, the state of charge (SOC) of the battery may need to be full or near-full in order to arrive at the destination without charging the vehicle battery. A vehicle battery that has a low state of charge may also be unable to commute long distances. Charging stations may facilitate in charging electric vehicles when the vehicle is not at its home location.

SUMMARY

A first illustrative embodiment discloses a vehicle computer system comprising a processor configured to receive a destination, to output a charging station location for display in response to an estimated (SOC) being less than a threshold and the location being within a pre-defined distance from a vehicle, and to not automatically output the location otherwise such that as a difference between the SOC and threshold increases, the pre-defined distance increases.

A second illustrative embodiment discloses a system comprising a processor configured to automatically output a plurality of charging station locations on a vehicle display when a SOC of a vehicle battery is below a threshold and within a pre-defined distance of a vehicle route to a destination such that as a difference between the SOC and threshold decreases, the pre-defined distance decreases.

A third illustrative embodiment discloses a method in a battery-electric vehicle, comprising automatically outputting a plurality of charging stations on a vehicle display in response to an estimate SOC of a battery being below a threshold and within a pre-defined distance of a vehicle route to a destination. The method further includes the steps of receiving input of a selected charging station selected from the plurality of charging stations, and sending vehicle route information and vehicle battery information to the selected station using a wireless transceiver.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
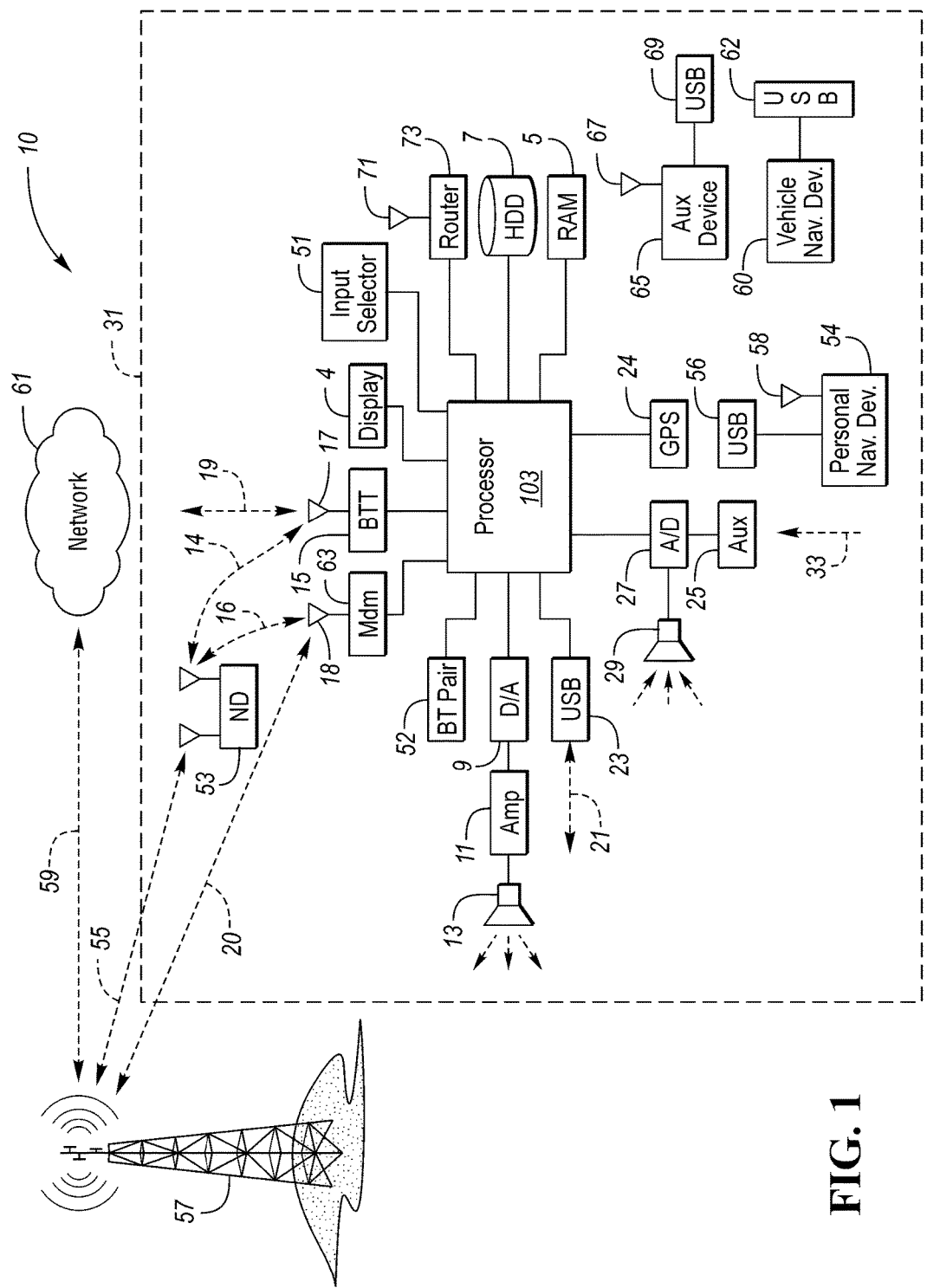
FIG. 1 illustrates an example block topology for a vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
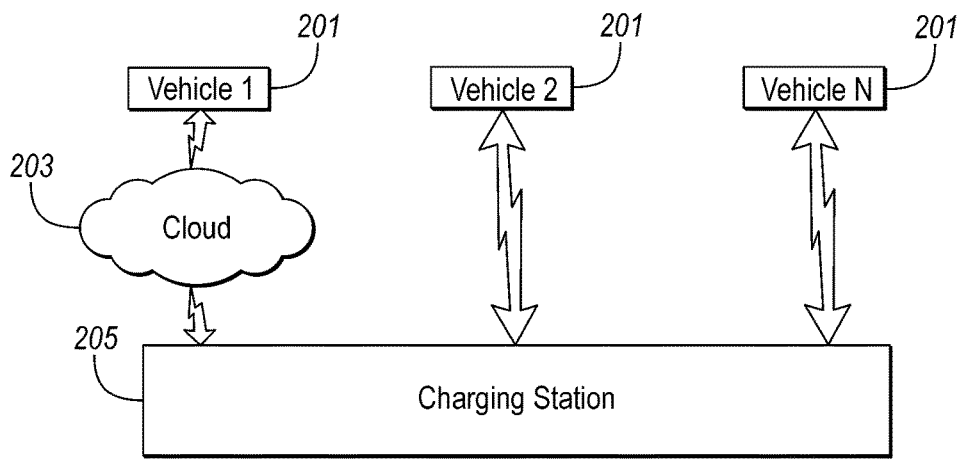
FIG. 2 illustrates an example block topology of vehicles interacting with a charging station.

FIG. 2 discloses an illustrative block topology of one or more vehicles and a charging station utilized to crowd-source information. One or more vehicles 201 may be in communication with the "cloud" 203 (e.g. one or more off-board servers). The vehicles 201 may send vehicle information to the cloud 203 that pertains to vehicle charging or that may be of use for a charging station. For example, the vehicle 201 may include a vehicle based computing system that includes a navigation system. The navigation system may allow the user to input one or more destinations to provide route guidance to the user. The vehicle 201 may then send both the one or more destinations to the cloud 203. The vehicle 201 may also send the routes that lead to the one or more destinations.

The vehicle may be a hybrid-vehicle or electric vehicle. As such, the vehicle's battery may be required to be charged in order to allow the vehicle to commute to a destination. Some destinations may be out of reach to drive based on the batteries charging capacity. For example, a cross-county trip may require multiple charges to be conducted. In another example, vehicle's charge level or state of charge may be low, requiring a specific amount of time for the vehicle to be charged to attain an appropriate state of charge level in order to commute to the destination.

The vehicle may provide the cloud 203 with information related to the vehicle battery. Such vehicle battery information may include the vehicle's current state of charge, vehicle's battery capacity, vehicle's estimated driving range, etc. Additionally, the cloud 203 may communicate the vehicle battery information to the charging station 205. The charging station 205 may utilize such information to determine how to optimize charging requirements of multiple vehicles.

The cloud may include its own database of information, including information pertaining to charging stations. Such information pertaining to the charging stations that may be utilized by the cloud include, but are not limited to, names of the charging station, location of the charging station, phone number of the charging station, number of ports and the charging station, charging port-types (e.g. voltage, quick charge, etc.), and other similar information.

The one or more vehicles 201 may also be in communication with one or more charging station 205. The charging stations 205 may be configured to send charging station information to the vehicles, either directly or through the cloud 203. The vehicles 201 may also send vehicle routing information and vehicle battery information directly to the charging stations 205 through the cloud 203.

Figure 3:
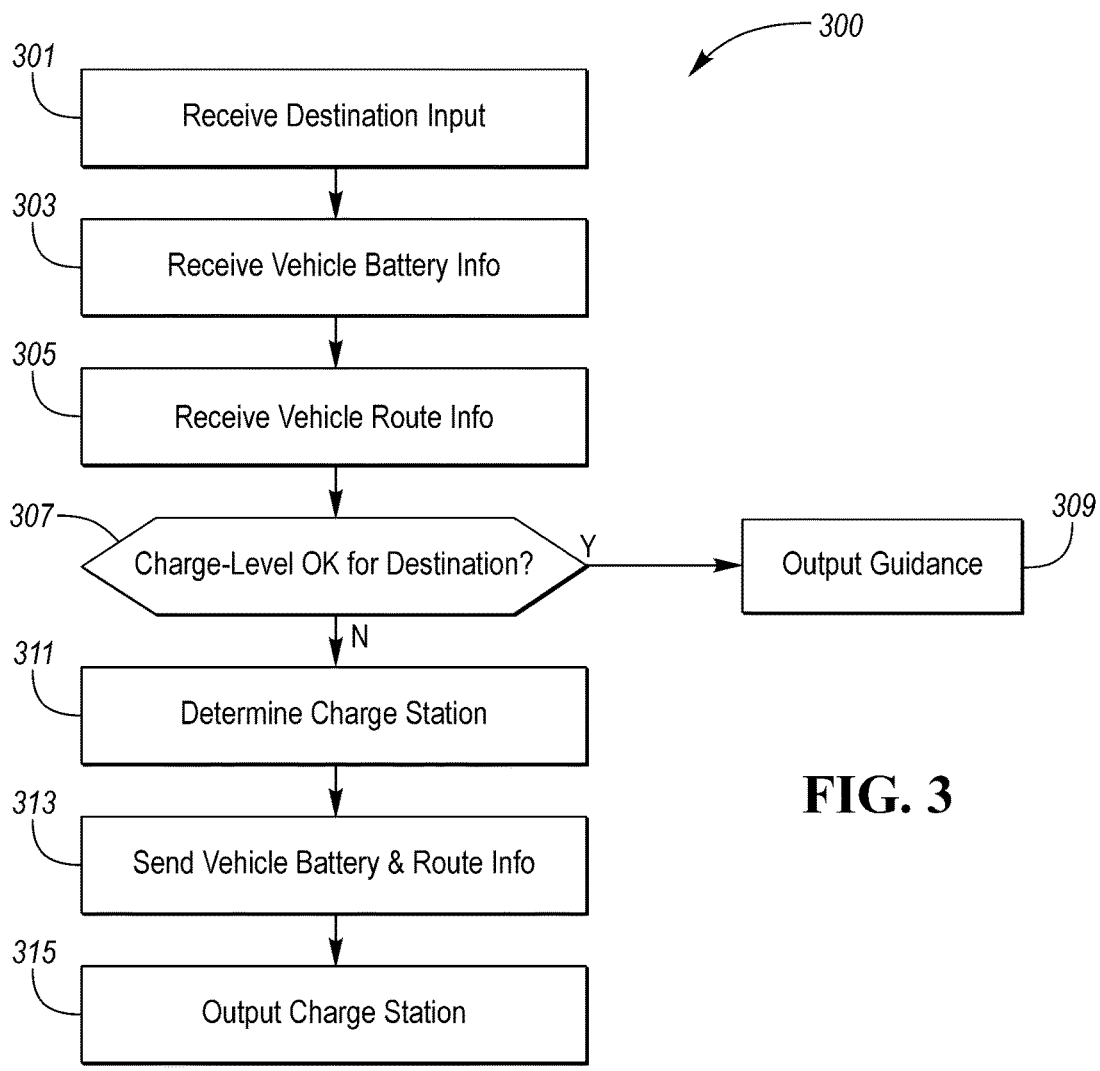
FIG. 3 is an illustrative flow chart of a vehicle based computing system interacting with a charging station or off-board server to crowd-source charging information.

FIG. 3 illustrates an illustrative flow chart 300 of a vehicle based computing system interacting with a charging station or off-board server to crowd-source charging information. The vehicle based computing system (i.e. vehicle computer system) may be equipped with a navigation system that allows a user to input a destination and calculate a route to that destination. The user may enter a destination into the navigation system that is received at the vehicle based computing system at step 301. Additionally, the vehicle based computing system may allow users to send destinations to the vehicle remotely utilizing mobile phones, tablets, computers, portable navigation device, etc.

The vehicle computer system may be in communication with various vehicle sensors utilizing the vehicle's communication bus (e.g. CAN-BUS). Based on that intra-vehicle communication, the vehicle computer system may receive vehicle battery info from those sensors at step 303. Such sensors may include the battery control module, vehicle system controller, powertrain controller, and other controllers. The sensors may send various data related to the vehicle battery or charging capabilities and requirements of the battery, including the current state of charge, estimated state of charge at the destination, estimated mileage based on the state of charge, battery type, quick-charge capability, etc. The vehicle battery info may be used by other vehicle processors or controllers for various processing. Additionally and as explained below, the vehicle battery info may be sent to off-board servers and charging stations.

The vehicle computer system may also be in communication with or include a navigation system (either on-board or off-board) to receive vehicle destination information and vehicle route information at step 305. A user may input destination information for one or more destinations into a navigation system. The navigation system may calculate one or more routes to the one or more destinations. The navigation system is also capable of re-routing based on traffic or route preferences (e.g. fastest, shortest, toll road avoidance, highway avoidance, eco-routing, etc.). While a user may input various destinations, the vehicle's SOC may below a threshold to commute to the one or more destinations. As charging stations may be less prevalent than a fuel station, a user may want to receive notifications about charging stations located near the destination or on route to the destination.

The vehicle computer system may calculate whether the vehicle can proceed to one or more destinations based on the vehicle's current state of charge at step 307. The vehicle computer system can compare the vehicle's estimate mileage with the route's distance to one or more of the destinations. The vehicle computer system may have a pre-defined threshold distance that may be exceeded to avoid outputting a recommended charging station. If the vehicle computer system determines that the state of charge exceeds the pre-defined threshold distance that the vehicle may travel to arrive at the destination, the vehicle may proceed to output guidance without notifying a user of a charging station at step 309. For example, if the state of charge is full or at 100% for the vehicle battery, and the vehicle is traveling to a nearby destination, the vehicle computer system may simply output guidance utilizing the navigation system.

If the SOC is below a pre-defined threshold distance that the vehicle must travel to arrive at a destination, the vehicle may delay outputting guidance, or output guidance but notify a user of a charging station, as described below. The vehicle computer system may determine a recommended charging station or multiple stations to facilitate the driver to arrive to their destination(s) at step 311. Additionally, an off-board server may also calculate a recommended charging station based on data communicated between the vehicle and the "cloud." The cloud may send such information for various charging station locations and other information relevant to the charging station to the vehicle utilized a wireless transceiver.

The recommended charging stations may be on route to the destination or at least within a vicinity of the route. For instance, the vehicle computer system may calculate charging stations within a driving distance of the vehicle based on the vehicle's state of charge and determine all charging stations within a pre-defined distance of the route to the destination. The pre-defined distance may be a ¼ mile, ½ mile, 1 mile, or any other distance deemed appropriate. The user can also define the pre-defined distance to travel "off-route" to find a charging station. The vehicle computer system will calculate that the vehicle charging station is capable of driving to the charging station based on the vehicle's estimate mileage (based on the vehicle's state of charge). The vehicle computer system may provide the user with multiple charging stations to select from. The vehicle may allow the user to select one or more charging stations to attempt to commute to in order to charge their vehicle.

In one example, the vehicle may have a low state of charge that is at twenty percent charge, which only allows a user to drive 60 miles. The destination may be 70 miles away. The vehicle computer system may determine a charging station for the vehicle that allows the user to effectively commute to the charging station with excess mileage available. The charging station may be on-route to the destination in order to allow the vehicle to efficiently arrive to the destination.

The pre-defined distance that defines how far "off-route" a vehicle travels may be adjusted automatically based on the vehicle's SOC. For example, as the vehicle's SOC increases, the pre-defined distance may increase. The vehicle's threshold level may also increase in such a scenario. On the other hand, as the SOC decreases, the pre-defined distance may decrease. The vehicle's threshold level may also decrease in such a scenario. The pre-defined distance may apply to either the vehicle's current location or a vehicle route.

The vehicle may send various vehicle data, including vehicle battery information and vehicle route information to an off-board server or charging station at step 313. The vehicle data may be utilized by the charging station to maximize efficiency of charging the vehicle for all vehicle's that may be charged at that station. For example, the server or charging station may collect information related to the vehicle's estimated time of arrival, state of charge, battery type, upcoming route and destination, and other information. The server or charging station may determine how long it takes for the vehicle to charge based on the type of battery and type of charging station port that is being used. The server or charging station may send charging port station information to the vehicle to notify the user of a recommended charging port to use. The vehicle computer system may also calculate the recommended charging port upon utilizing the vehicle route information, vehicle battery information, and charging port information.

The vehicle computer system may output the recommended charging station at step 315 for the vehicle to use given the vehicle environment. The vehicle computer system may output the charging station on a vehicle display, a nomadic device in communication with the vehicle computer system, or utilize audible output to notify the user of the recommended charging station. Additionally, the vehicle computer system may output a charging port location to further maximize efficiency of the user's charging of the vehicle battery.

Figure 4:
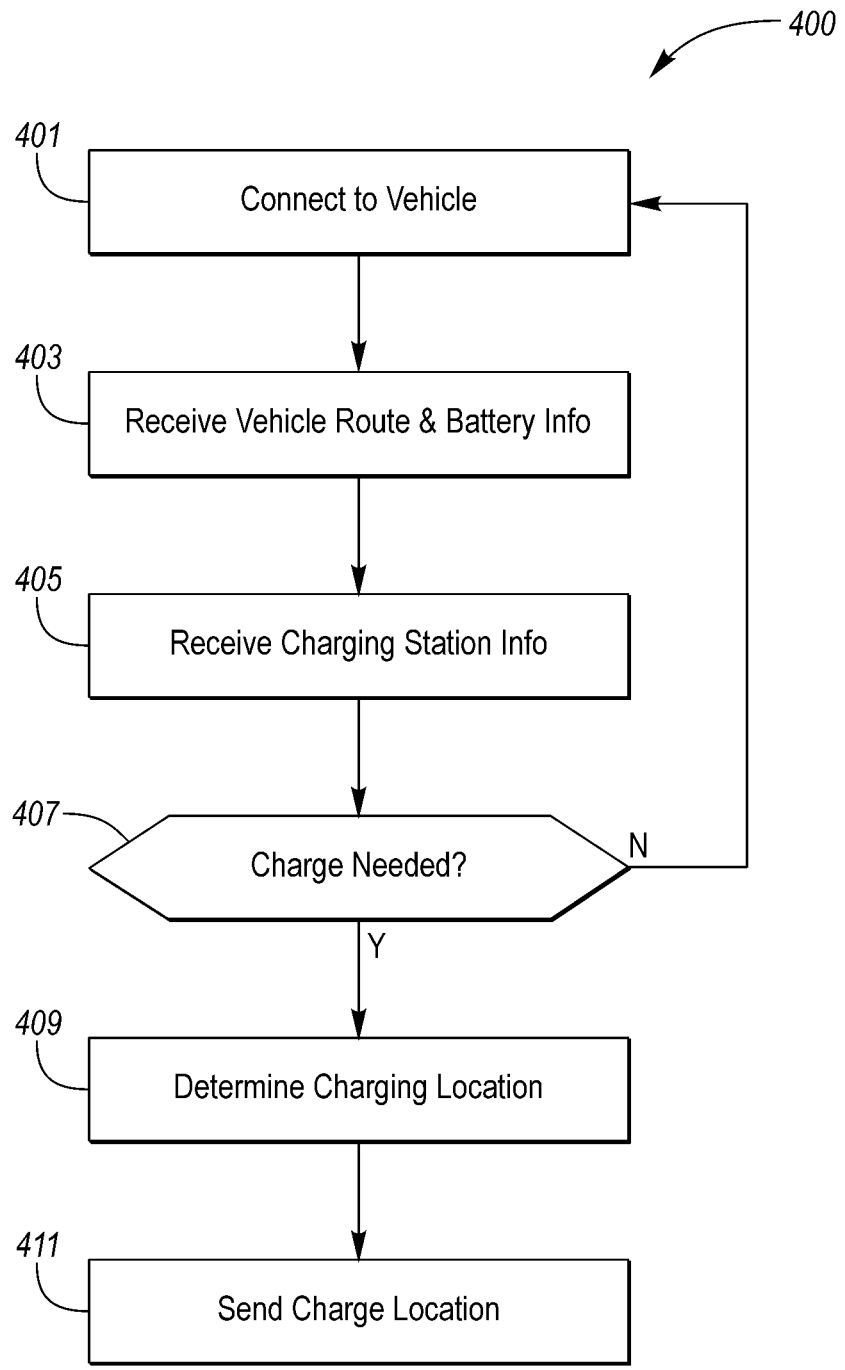
FIG. 4 is an illustrative flow chart of a server interacting with vehicles and charging stations for crowd-sourcing of charging information.

FIG. 4 illustrates an illustrative flow chart 400 of a server interacting with vehicles and charging stations for crowdsourcing of charging information. The server or charging station may run all or part of the steps in flow chart 400 independently or collectively. The server may connect to the vehicle at step 400. The vehicle may be equipped with a wireless transceiver that allows the vehicle and server to communicate information between the vehicle and the server (or additional servers). Such information may be utilized to determine an appropriate charge station, port location, charging time, etc.

The cloud or charging station may receive various data from a navigation system of the vehicle at step 403, including vehicle route information and vehicle batter information. The vehicle route information may include information about the vehicle's current path or route information around the vicinity of the vehicle, including traffic and road closures. Additionally, the vehicle route information may include future travel plans, information about route preferences, destination information, how soon an operator intends to leave after a charge, how far the operator intends to drive, etc. The vehicle route information may be utilized by the charging station or server to determine when the vehicle will arrive or to utilize the vehicle's travel plans or preferences to output an recommended charging station or charging port location within the station, etc.

The cloud or charging station may also receive various data from the vehicle related vehicle battery information at step 405. The charging station may receive data collected by the vehicle computer system that was received from a battery control module, vehicle system controller, powertrain controller, and other controllers related to the vehicle battery. The sensors may send various data related to the vehicle battery or charging capabilities and requirements of the battery, including the current state of charge, estimated state of charge at the destination, estimated mileage based on the state of charge, battery type, quick-charge capability, vehicle battery specification information, etc. The vehicle battery information may be utilized by the charging station or server to determine how long to charge the vehicle battery, the requirements of the vehicle battery, estimate how long the vehicle will take to charge, etc.

The cloud or charging station may receive a message or other input to determine that a charge is needed at step 407. The cloud or charging station itself may receive data from the vehicle or server that indicates that the vehicle requires a charge. Such data may originate from the vehicle's battery control module or navigation system. If no charge is needed, the charging station or cloud may continue communication with the vehicle to periodically receive or send data or other information. In certain scenarios, the cloud or charging station may receive a message or determine that the vehicle currently requires a charge or may require a charge in the future. For example, the vehicle may require a charge to proceed to the vehicle's route.

The cloud or the charging station may determine a recommended charging location at step 409. The recommended charging location may be based on the information communicated by the vehicle to the server or charging station, as well as utilizing information or data from the charging stations. The cloud or charging station may utilize the information received from the vehicle, including information or data from the vehicle navigation system indicating the vehicle's current route. For example, the cloud or charging station may determine that an upcoming charging station is located within a pre-defined distance from the vehicle's route. Additionally, the cloud or charging station may utilize information or data from the charging station to identify a recommended charging port. For example, the cloud or charging station may recognize the specification of the battery, coupled by the requirements of the vehicle's route and charge requirements, to determine a charging station port location for the vehicle to maximize efficiency for the vehicle and driver.

The cloud or charging station may send the vehicle a recommended charging station location at step 411. The recommended charging station location may be output on a vehicle display, such as a navigation system display. The charging station location may be include on a map and overplayed with other navigation information, including a vehicle's route(s) or destination(s). Additionally, the vehicle computer system may output a recommended charging station utilizing vehicle speakers and a voice recognition dialogue. The charging station may be output by the voice recognition system using the vehicle speakers, allowing a user to select the recommended charging station without utilizing the vehicle navigation system. For example, the voice recommendation system may output the recommended charging port location through vehicle speakers and ask the user if they would like to visit the charging station. If the user replies that it would like to visit the charging station (and corresponding charging port), the vehicle computer system may enter the location as a destination and prompt the vehicle to drive to the location. Additionally, the vehicle computer system may output (on a display or speakers) various information about the charging station location or charging port, such as the cross-roads, telephone number, name, charging port specifications, charging port number, etc. The charging station may also utilize the various data communicated between the vehicle and charging station to determine whether the vehicle requires a maximum charge or simply a charge to a threshold SOC to proceed to the user's destination(s).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle computer system, comprising:
a wireless transceiver configured to communicate vehicle route information and vehicle battery information with a charging station; and
a processor configured to receive a destination, to output a charging station location for display in response to an estimated state of charge (SOC) is below a threshold and the charging station location being within a pre-defined distance from a vehicle route to the destination, wherein the pre-defined distance is defined by a user of a vehicle and is configured to automatically adjust based on the vehicle's SOC, and to not automatically output the charging station location otherwise such that as the SOC is both below the threshold and the charging station location is further from the vehicle than the pre-defined distance, wherein the pre-defined distance is configured to automatically increase as the SOC increases.

2. The vehicle computer system of claim 1, wherein the vehicle route information includes at least the vehicle route to the destination, the destination, or a route preference.

3. The vehicle computer system claim 1, wherein the wireless transceiver is further configured to receive charging port information from the one or more charging stations, and wherein the processor is further configured to output a recommended charging port location in response to the vehicle battery information, vehicle route information, charging port information, and the estimated SOC at the destination.

4. The vehicle computer system of claim 3, wherein the charging port information includes at least one of charging port occupancy, charging port voltage, or charging port speed.

5. The vehicle computer system of claim 3, wherein the recommended charging port location is output utilizing voice recognition dialogue of the vehicle computer system.

6. The vehicle computer system of claim 1, wherein the wireless transceiver communicates to the charging station through an off-board server.

7. The vehicle computer system in a vehicle of claim 1, wherein the at least one charging station is within a pre-defined distance of a vehicle route.

8. The vehicle computer system of claim 1, wherein the vehicle battery information includes at least one of a SOC of the vehicle battery, a quick-charge capability of the vehicle battery, or a minimum charge requirement of the vehicle battery.

9. A system comprising:
a processor configured to automatically to send vehicle route and battery information to a selected charging station using a wireless transceiver and output a charging station locations on a vehicle display when a state of charge (SOC) of a vehicle battery is below a threshold and within a pre-defined distance of a vehicle route, wherein the pre-defined distance is user defined and configured to automatically increase based as the SOC increases.

10. The system of claim 9, wherein the wireless transceiver is further configured to receive charging port information from the selected charging station, and wherein the processor is further configured to receive user input requesting a recommended charging port location, and output the recommended charging port location in response to the charging port information and an estimated SOC at a destination of the vehicle route.

11. The system of claim 10, wherein the charging port information includes at least one of charging port occupancy, charging port voltage, or charging port speed.

12. The system of claim 10, wherein the recommended charging port location is output in response to the vehicle route information and vehicle battery information.

13. A method in a battery-electric vehicle, comprising:
automatically outputting a plurality of charging stations on a vehicle display in response to an estimate state of charge (SOC) of a battery being below a threshold and within a pre-defined distance of a vehicle route to a destination and not outputting the plurality of charging stations on the vehicle display in response to the estimate SOC being above the threshold, wherein the pre-defined distance is defined by a user of the battery-electric vehicle, wherein the pre-defined distance automatically increase as the SOC increases;
receiving input of a selected charging station selected from the plurality of charging stations;
sending vehicle route information and vehicle battery information to the selected station using a wireless transceiver.

14. The method of claim 13, further comprising receiving charging port information from the selected charging station, and outputting a recommended charging port location.

15. The method of claim 14, wherein the recommended charging port location is output utilizing vehicle speakers.

16. The method of claim 13, wherein the vehicle route information includes an estimated arrival time at the selected charging station.

* * * * *